US012730880B2

(12) United States Patent
Conn et al.

(10) Patent No.: US 12,730,880 B2
(45) Date of Patent: Sep. 8, 2026

(54) CONFIDENTIAL COMPUTING FOR CONTINUOUS INTEGRATION PIPELINES

(71) Applicant: Dell Products L.P., Round Rock, TX (US)

(72) Inventors: Trevor Scott Conn, Leander, TX (US); Jeremy Christian Phelps, Venice, FL (US); Yichun Xu, Everett, MA (US)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 18/746,035

(22) Filed: Jun. 18, 2024

(65) Prior Publication Data

US 2025/0384123 A1 Dec. 18, 2025

(51) Int. Cl.
*G06F 21/53* (2013.01)
*G06F 9/455* (2018.01)

(52) U.S. Cl.
CPC .......... *G06F 21/53* (2013.01); *G06F 9/45558* (2013.01); *G06F 2221/033* (2013.01)

(58) Field of Classification Search
CPC ................. G06F 21/53; G06F 9/45558; G06F 2221/033; G06F 9/455
See application file for complete search history.

(56) References Cited

U.S. PATENT DOCUMENTS

2019/0180006 A1* 6/2019 Bojjireddy .............. G06F 9/455
2019/0372983 A1* 12/2019 Trabelsi .............. G06F 9/45558
2022/0066809 A1* 3/2022 Liu ..................... G06F 9/45558
2023/0393780 A1* 12/2023 Izzo ...................... G06F 3/0679

OTHER PUBLICATIONS

Confidential Computing: Hardware-Based Trusted Execution for Applications and Data. A Publication of the Confidential Computing Consortium. Nov. 2022. V1.3. https://confidentialcomputing.io/wp-content/uploads/sites/10/2023/03/CCC_outreach_whitepaper_updated_November_2022.pdf.
AWS CodeBuild Build and test code with automatic scaling. https://aws.amazon.com/codebuild/.
Azure Pipelines. https://azure.microsoft.com/en-us/products/devops/pipelines.
Confidential Containers. https://github.com/confidential-containers/documentation/blob/main/overview.md.
GlobalPlatform. Technology Document Library Protecting digital services through standardization. https://globalplatform.org/specs-library/?filter-committee=tee.
Wikipedia. Confidential computing. https://en.wikipedia.org/wiki/Confidential_computing.
Jenkins. Build great things at any scale. https://www.jenkins.io/.

* cited by examiner

*Primary Examiner* — Robert B Leung
*Assistant Examiner* — Howard H. Louie
(74) *Attorney, Agent, or Firm* — Workman Nydegger

(57) ABSTRACT

One example method includes integrating a TEE (trusted execution environment) into an architecture that supports multiple tenants, making the TEE available to a secure environment in the architecture, executing a workload comprising a continuous integration pipeline in the secure environment, using the TEE, wherein the workload is hosted in the secure environment, and securing, using the TEE, an artifact of the executing of the workload. The secure environment may be a Confidential Container, or a Trust Domain in which a virtual machine is running.

20 Claims, 3 Drawing Sheets

CONFIDENTIAL COMPUTING FOR CONTINUOUS INTEGRATION PIPELINES

COPYRIGHT AND MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNOLOGICAL FIELD OF THE DISCLOSURE

One or more embodiments disclosed herein generally relate to confidential computing for continuous integration pipelines. More particularly, at least some embodiments relate to systems, hardware, software, computer-readable media, and methods, for implementing confidentiality and security in multi-tenant build pipelines.

BACKGROUND

The goal of Confidential Computing (CC) is to secure data when the data is in use. This entails either securing data in use through encryption or by isolating data to areas of memory that can only be accessed when the execution permissions of an application are elevated. Implementations of these approaches include Trusted Execution Environments (TEE) such as the TrustZone by Arm, or a Secure Enclave such as the Intel SGX/TDX.

Confidential Computing arose due to concerns about IP (intellectual property) and/or data exposure risk during workload execution in a multi-tenant environment. Consider a Cloud Service Provider (CSP) such as Amazon or Google that hosts workloads from a variety of customers on a single physical host. If a VM or other workload running on behalf of Customer A is compromised, that could lead to an attacker being able to view memory in which information about a workload of Customer B resides. A hardware-based approach to securing the memory, enabled through software extensions underlies the approaches described above.

However, the focus of this effort has ignored a key aspect of the application delivery process. Namely, the build pipelines hosted by CSPs which assemble applications for delivery can also be executed in multi-tenant environments. Consider the Amazon CodeBuild or Microsoft Azure Pipelines as examples. A build pipeline is, itself, a type of workload, albeit a short-lived one, that when run in a multi-tenant environment is vulnerable to the same kind of attack described above. The approaches provided by Confidential Computing practices are not currently thought of as being relevant to protect IP, source code, and other relevant data and metadata, typically available in memory during a build.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1:
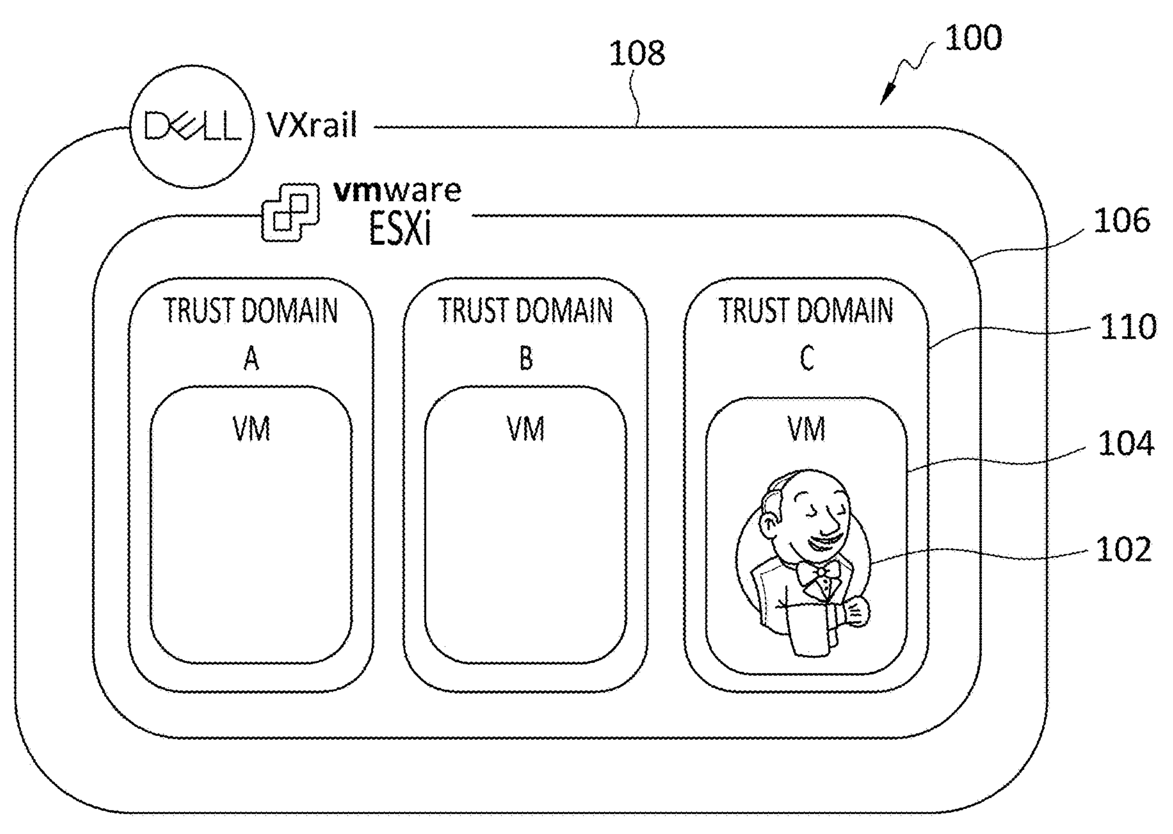
FIG. 1 discloses aspects of an architecture in which a build pipeline can execute in a Trusted VM (C) on a stack that may comprise multiple trust domains, according to one embodiment.

One or more embodiments disclosed herein generally relate to confidential computing for continuous integration pipelines. More particularly, at least some embodiments relate to systems, hardware, software, computer-readable media, and methods, for implementing confidentiality and security in multi-tenant build pipelines.

In general, some example embodiments comprise, but are not limited to, (1) methods for the use of confidential computing for continuous integration pipelines, (2) methods for the construction, and/or use, of continuous integration pipelines that implement confidential computing, and (3) architectures such as continuous integration, or build, pipelines that are operable to implement confidential computing.

One method according to an embodiment may comprise the operations: integrating a TEE, of a processor, with a hypervisor to enable the hypervisor to securely create a respective VM inside of isolated Trust Domains which use integrated hardware to provide Trusted Computing guarantees; receiving a request to trigger a secure build; in response to the request, initializing a trusted VM configured and operable to execute a build application; and, performing the secure build with the build application.

A method according to another embodiment may comprise the operations: at runtime, invoking a lightweight hypervisor within an OS in to provide managed resources to virtual hosts; hosting, within the OS, a TEE infrastructure; within one of the virtual hosts, hosting a build pipeline as a containerized application; and, executing the containerized application using the TEE infrastructure.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that protections afforded by a TEE may be integrated within a continuous integration build pipeline. An embodiment may protect artifacts created by a CI build pipeline. An embodiment may employ various different hypervisors to implement TEE protections in a CI build pipeline. An embodiment may provide protection for a build pipeline while the build pipeline is being executed. Various other advantages of one or more example embodiments will be apparent from this disclosure.

A. REFERENCES

The following documents are incorporated herein in their respective entireties by this reference:

1. https://confidentialcomputing.io/wp-content/uploads/sites/10/2023/03/CCC_outreach_whitepaper_updated_November_2022.pdf
2. https://aws.amazon.com/codebuild/
3. https://azure.microsoft.com/en-us/products/devops/pipelines
4. https://github.com/confidential-containers/documentation/blob/main/overview.md
5. https://globalplatform.org/specs-library/?filter-committee=tee

B. CONTEXT FOR AN EXAMPLE EMBODIMENT

As noted earlier, one or more embodiments may be implemented that incorporate and apply the principles of Confidential Computing (CC). Confidential Computing has been defined as " . . . a security and privacy-enhancing computational technique focused on protecting data in use. Confidential computing can be used in conjunction with storage and network encryption, which protect data at rest and data in transit respectively. It is designed to address software, protocol, cryptographic, and basic physical and supply-chain attacks, although some critics have demonstrated architectural and side-channel attacks effective against the technology. The technology protects data in use by performing computations in a hardware-based trusted execution environment (TEE). Confidential data is released to the TEE only once it is assessed to be trustworthy." See https://en.wikipedia.org/wiki/Confidential_computing.

Example embodiments may be applicable to various circumstances and scenarios. For example, by integrating CC principles in a CI pipeline scenario, that is, in a scenario in which a build pipeline may be considered a type of workload that can execute in a multi-tenant environment, an embodiment may afford the protections of CC to the build pipeline and processes. As another example, an embodiment may provide protection, in a VM, host or container in which a build pipeline is executing, against an attacker that is attempting to access IP, and/or data held in memory, such as source code, configuration, and secrets. An embodiment may provide protection in both cloud, and on-premises, environments. This may be particularly useful since, in on-premises environments for example, it is common to share a single virtualized host, which may be TEE-enabled, where many container builds are executed. Thus, an embodiment may integrate Confidential Containers with common build tools in such a setup and, in this way, provide protection to the containers themselves. As a final example, an embodiment may implement CC protection on-premise and edge compute environments that typically lack physical security of devices that run workloads. This may be important since, while such devices may execute workloads in a TEE, that is no impediment to an attacker who intends to physically take control of the device.

C. OVERVIEW OF ASPECTS OF SOME EXAMPLE EMBODIMENTS

An embodiment may comprise a multi-tenant build pipeline, and associated methods for its construction and use, that have the ability to integrate with a TEE at strategic points where confidentiality needs to be assured. For example, it may be required that active handling of source code, configuration data, secrets or other elements relevant to application assembly should be resident in secure and protected memory. In addition, it may be required that artifacts produced by the pipeline itself are held in secure memory during assembly and are written out to some persistent store only after being encrypted.

Build pipelines may be executed in a number of ways such as, for example, on a native host, in a VM, or in a container. In addition, build pipelines may invoke scripts for custom operations which run as a separate process. A method according to one embodiment may be implemented at the hypervisor level. As discussed below, embodiments provide for various possible scenarios, based on how the hypervisor is used.

C.1 Bare-Metal Hypervisor

In this scenario, a bare-metal hypervisor, such as the VMware ESXi for example, may be installed directly on a host machine and may be responsible for managing the physical hardware resources as they apply to various virtual hosts. In this case, invocation of a build pipeline workload may cause a new virtual machine (VM) to be spun up with the build application, such as Jenkins (https://www.jenkins.io/) for example, running directly in the VM.

In one embodiment, the hypervisor is integrated with a TEE implementation provided by the hardware vendor, such as Intel TDX or AMD SEV for example, so that the build pipeline will execute with the protections afforded by Confidential Computing. This includes any additional processes that may be created from something, such as a custom script, called by a pipeline step. However, due to isolation constraints, it may not embrace a scenario where the pipeline creates a container in order to perform a build. For security reasons, containerized workloads can be isolated from native hardware resources like the CPU/GPU, filesystem, and networking. In one scenario, this may preclude the use of any hardware to facilitate Confidential Computing during a build.

C.2 Lightweight Hypervisor

In this scenario, a lightweight hypervisor, such as QEMU or Oracle VirtualBox for example, may be invoked at runtime within a given OS (operating system) in order to provide managed resources to virtual hosts. These hypervisor instances may be used to wrap workloads, such as containers for example, for ephemeral execution. One advantage of such hypervisor instances is the speed at which virtualization can be implemented, as well as reduced management overhead.

The use, in one embodiment, of Confidential Containers, may enable a build pipeline to be executed as a containerized application so as to take advantage of the TEE infrastructure hosted by the OS. Further, in one embodiment, a build pipeline running within a VM on a bare-metal hypervisor that needs to spin up a container may obtain protection through the use of Confidential Containers.

One embodiment may, independent of which hypervisor approach is employed, operate to secure the output of the build, whether that be a binary payload, test results, or Software Bill of Materials information, for example—inside the TEE during assembly. At the point where the output of the build pipeline needs to be persisted, if warranted by requirements, the output may be encrypted and persisted to disk or sent to a destination over the network. In this way, the output of the build pipeline is never handled in the clear and its security is preserved.

D. DETAILED DISCUSSION OF ASPECTS OF EXAMPLE EMBODIMENTS

D.1 Bare-Metal Hypervisor

Figure 2:
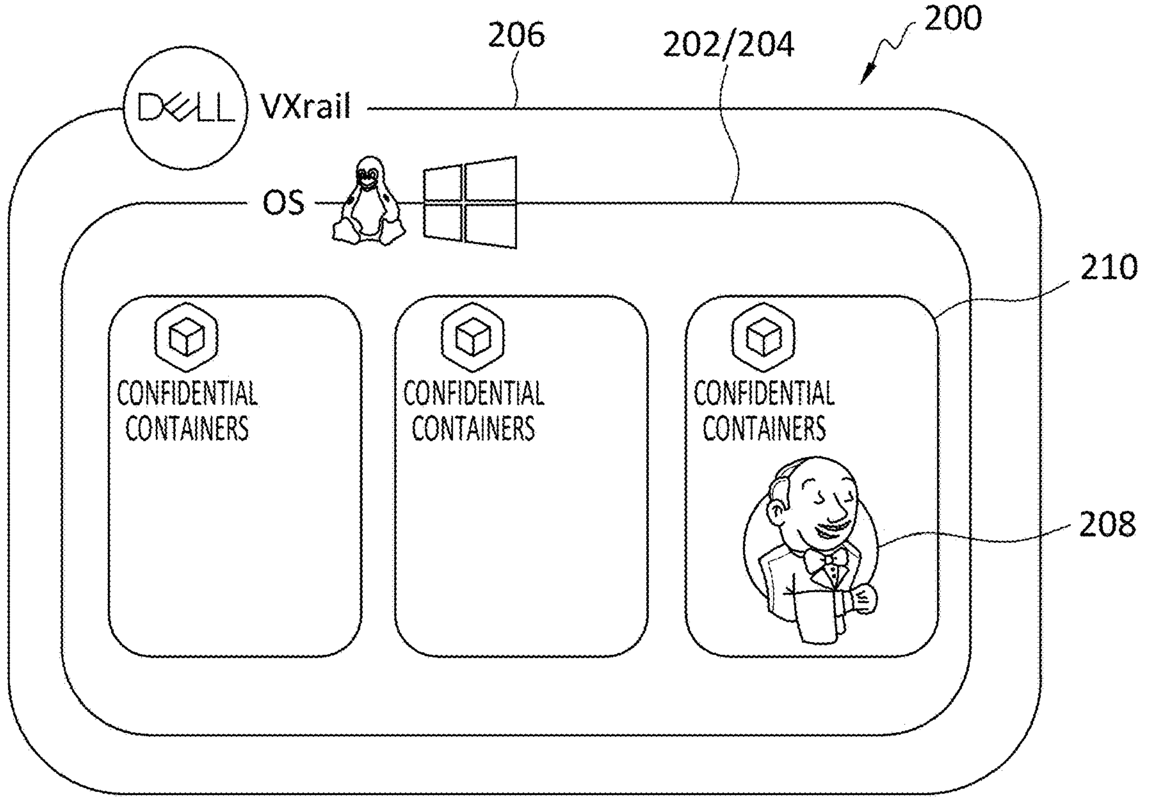
FIG. 2 discloses aspects of an architecture in which a build pipeline can execute within a Confidential Container deployed into a native OS, according to one embodiment.

In general, the examples of FIGS. 1 and 2 comprise a visual representation of some ways in which the various hypervisor approaches, introduced above, differ from each other. With reference first to FIG. 1, an example bare-metal hypervisor architecture according to one embodiment is denoted at 100. It is noted that it is common for CSPs or enterprises to host workloads using a bare-metal hypervisor which uses VMs to ensure separation between various workloads. The architecture disclosed in FIG. 1 indicates an arrangement in which a build pipeline is considered as a workload and is hosted within a bare-metal type stack.

In the particular, but non-limiting, case disclosed in FIG. 1, a Jenkins build pipeline 102, or other build application, is executing in a Trusted VM (C) 104 on an example Dell/VMWare stack. In more detail, a server class infrastructure 108, such as a Dell VXRail, may be employed that is equipped with a 4th generation Intel Xeon processor. This, or another, processor may be equipped with a Trusted Domain module that can be integrated with a selected enterprise-class hypervisor 106, such as the VMWare ESXi, through the use of software known as Trust Domain Extensions (TDX). This configuration and arrangement enables the hypervisor 106 to securely create VMs, such as the VM 104, inside of an isolated Trust Domain 110 which may use integrated hardware to provide Trusted Computing guarantees. In an embodiment, one or more of the Trust Domains 110 may be associated with a different respective tenant of a multi-tenant environment.

In the configuration of FIG. 1, a request to trigger a secure build would initialize a trusted VM 104 for the purpose of executing Jenkins 102, or another build application, for the build. Note that in order to leverage the TEE protections of the processor, Jenkins 102 or other build application, in this case may have to run as a native application in the trusted VM 104.

D.2 Lightweight Hypervisor

One example architecture 200 is disclosed in FIG. 2, which shows a Jenkins build pipeline executing within a Confidential Container deployed into a native OS. As illustrated by the example architecture 200, an embodiment may employ a lighter hypervisor 202 running in an OS 204, hosted in a server class infrastructure 206, for the purpose of executing containerized workloads 208, such as Jenkins for example. This configuration may enable multiple containers 210, which may be Confidential Containers, to be created and/or destroyed more quickly since the resources of a full VM do not need to be allocated, or reclaimed. Further, through the Confidential Containers 210 approach, containerized workloads can access the underlying TEE, included in the processor of the server class infrastructure 206, through an abstraction layer.

Again, a given server class infrastructure 206 host which may be running either Linux OS or Windows OS, generically indicated at 204 in FIG. 2, may participate in and/or with a workload orchestrator such as Kubernetes. In this case, rather than spinning up a VM to host a given pod for one or more containers, the containerized workloads may be hosted directly. Each Confidential Container 210 instance may have a lightweight virtualization wrapper, possibly facilitated by QEMU using Kata Containers, which provides hardware isolation and access to the underlying TEE. The work of integrating the TEE hardware through the virtualization layer is handled by the Confidential Container project and architecture.

E. EXAMPLE METHODS

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 3:
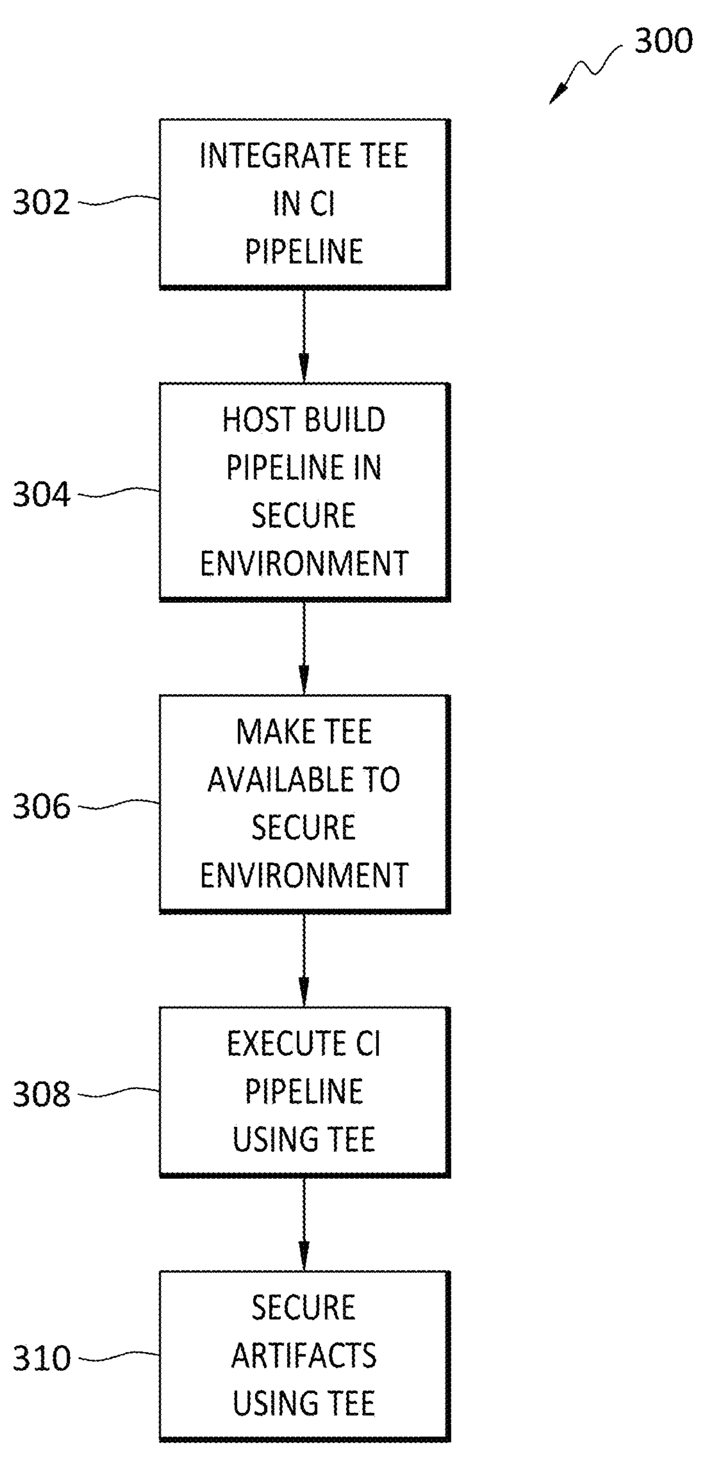
FIG. 3 discloses a method according to one embodiment.

Directing attention now to FIG. 3, an example method 300 according to one embodiment is disclosed. The example method 300 may begin with integration 302 of a TEE in a CI pipeline and/or hardware that supports operations of the CI pipeline.

Next, the CI pipeline may be hosted 304 in a secure environment. The secure environment may be a Trust Domain, or a Confidential Container. In either case, the CI pipeline may be considered as an executable workload.

When the CI pipeline is ready to run, the TEE may be made available 306 to support the execution of the CI pipeline. A hypervisor, such as a bare-metal hypervisor or a lightweight hypervisor, may be used to make the TEE available 306 to the secure environment in which the CI pipeline is to run. The CI pipeline may then be executed 308 in the secure environment, using the TEE.

When the CI pipeline execution is complete, any artifacts, such as an application for example, resulting from the execution may be secured 310 using the TEE. For example, an artifact may be persisted to secure storage, or an artifact may be encrypted prior to use or transmission.

F. FURTHER DISCUSSION

As disclosed herein, various embodiments may comprise one or more useful features and aspects, although no embodiment is required to possess any of such features and aspects. The following examples are illustrative. An embodiment may provide integration of a Continuous Integration (CI) build pipeline with the protections afforded by a TEE. An embodiment may provide such integration in various ways. An embodiment may make the TEE available to a VM via a bare-metal hypervisor communication with the underlying hardware, or a lightweight hypervisor may be used within an OS to provide the TEE to a container. As a final example, an embodiment may secure the artifacts produced by the CI build pipeline, using the TEE. These artifacts may be encrypted before use or persistence as requirements determine.

G. FURTHER EXAMPLE EMBODIMENTS

Following are some further example embodiments. These are presented only by way of example and are not intended to limit the scope of this disclosure or the claims in any way.

Embodiment 1. A method, comprising: integrating a TEE (trusted execution environment) into an architecture that supports multiple tenants; making the TEE available to a secure environment in the architecture; executing a workload comprising a continuous integration pipeline in the secure environment, using the TEE, wherein the workload is hosted in the secure environment; and securing, using the TEE, an artifact of the executing of the workload.

Embodiment 2. The method as recited in any preceding embodiment, wherein the secure environment comprises a Trust Domain managed by a bare-metal hypervisor.

Embodiment 3. The method as recited in embodiment 2, wherein the workload runs on a VM (virtual machine) in the Trust Domain.

Embodiment 4. The method as recited in any preceding embodiment, wherein the secure environment comprises a Confidential Container managed by a lightweight hypervisor running in an OS (operating system) of the architecture.

Embodiment 5. The method as recited in any preceding embodiment, wherein the workload runs as a native application in the secure environment.

Embodiment 6. The method as recited in any preceding embodiment, wherein the workload runs on a VM in the secure environment, and the TEE is made available to the secure environment by communication of a bare-metal hypervisor, which manages the VM, with underlying hardware of the TEE.

Embodiment 7. The method as recited in any preceding embodiment, wherein the secure environment comprises a Confidential Container, and the TEE is made available to the Confidential Container by a lightweight hypervisor running in an OS of the architecture.

Embodiment 8. The method as recited in any preceding embodiment, wherein securing the artifact comprises encryption of the artifact, and/or persistence of the artifact.

Embodiment 9. The method as recited in any preceding embodiment, wherein the artifact comprises an application.

Embodiment 10. The method as recited in any preceding embodiment, wherein the architecture resides in a cloud environment, or in an on-premises environment.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 4:
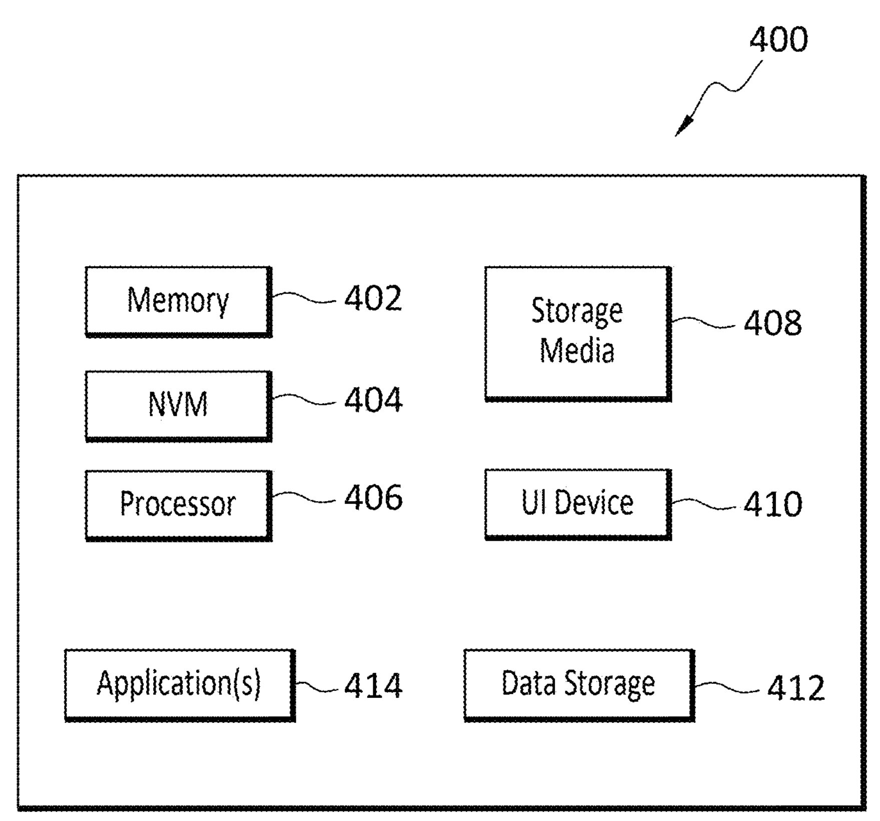
FIG. 4 discloses an example computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method, comprising:

integrating a TEE (trusted execution environment) into an architecture that supports multiple tenants;

making, by a hypervisor, the TEE available to a secure environment in the architecture, wherein the secure environment comprises one of (i) a Trust Domain managed by a bare-metal hypervisor or (ii) a Confidential Container managed by a lightweight hypervisor running in an operating system of the architecture;

executing a workload comprising a continuous integration pipeline that is executed within the secure environment, using the TEE, wherein the workload is hosted in the secure environment during execution of the continuous integration pipeline; and securing, using the TEE, an artifact of the executing of the workload, wherein the artifact is maintained in protected memory of the TEE during execution of the continuous integration pipeline and is encrypted while persisting outside the secure environment, the encryption process being performed prior to persistence outside the secure environment.

2. The method as recited in claim 1, wherein the secure environment comprises the Trust Domain managed by the bare-metal hypervisor.

3. The method as recited in claim 2, wherein the workload runs on a VM (virtual machine) in the Trust Domain.

4. The method as recited in claim 1, wherein the secure environment comprises the Confidential Container managed by the lightweight hypervisor running in the operating system of the architecture.

5. The method as recited in claim 1, wherein the workload runs as a native application in the secure environment.

6. The method as recited in claim 1, wherein the workload runs on a VM in the secure environment, and the TEE is made available to the secure environment by communication of the bare-metal hypervisor, which manages the VM, with underlying hardware of the TEE.

7. The method as recited in claim 1, wherein the secure environment comprises the Confidential Container, and the TEE is made available to the Confidential Container by the lightweight hypervisor running in the operating system of the architecture.

8. The method as recited in claim 1, wherein securing the artifact comprises encryption of the artifact, and/or persistence of the artifact.

9. The method as recited in claim 1, wherein the artifact comprises an application.

10. The method as recited in claim 1, wherein the architecture resides in a cloud environment, or in an on-premises environment.

11. A non-transitory storage medium having stored therein instructions that are executable by one or more hardware processors to perform operations comprising:

integrating a TEE (trusted execution environment) into an architecture that supports multiple tenants;

making, by a hypervisor, the TEE available to a secure environment in the architecture, wherein the secure environment comprises one of (i) a Trust Domain managed by a bare-metal hypervisor or (ii) a Confidential Container managed by a lightweight hypervisor running in an operating system of the architecture;

executing a workload comprising a continuous integration pipeline that is executed within the secure environment, using the TEE, wherein the workload is hosted in the secure environment during execution of the continuous integration pipeline; and securing, using the TEE, an artifact of the executing of the workload, wherein the artifact is maintained in protected memory of the TEE during execution of the continuous integration pipeline and is encrypted while persisting outside the secure environment, the encryption process being performed prior to persistence outside the secure environment.

12. The non-transitory storage medium as recited in claim 11, wherein the secure environment comprises a Trust Domain managed by a bare-metal hypervisor.

13. The non-transitory storage medium as recited in claim 12, wherein the workload runs on a VM (virtual machine) in the Trust Domain.

14. The non-transitory storage medium as recited in claim 11, wherein the secure environment comprises the Confidential Container managed by the lightweight hypervisor running in the operating system a of the architecture.

15. The non-transitory storage medium as recited in claim 11, wherein the workload runs as a native application in the secure environment.

16. The non-transitory storage medium as recited in claim 11, wherein the workload runs on a VM in the secure environment, and the TEE is made available to the secure environment by communication of the bare-metal hypervisor, which manages the VM, with underlying hardware of the TEE.

17. The non-transitory storage medium as recited in claim 11, wherein the secure environment comprises the Confidential Container, and the TEE is made available to the Confidential Container by the lightweight hypervisor running in the operating system of the architecture.

18. The non-transitory storage medium as recited in claim 11, wherein securing the artifact comprises encryption of the artifact, and/or persistence of the artifact.

19. The non-transitory storage medium as recited in claim 11, wherein the artifact comprises an application.

20. The non-transitory storage medium as recited in claim 11, wherein the architecture resides in a cloud environment, or in an on-premises environment.

* * * * *